US012567741B2

(12) United States Patent
Zan et al.

(10) Patent No.: US 12,567,741 B2
(45) Date of Patent: Mar. 3, 2026

(54) POWER SUPPLY APPARATUS AND POWER SYSTEM

(71) Applicant: Huawei Digital Power Technologies Co., Ltd., Shenzhen (CN)

(72) Inventors: Lei Zan, Dongguan (CN); Xue Zhang, Dongguan (CN); Ning Wang, Dongguan (CN); Yukun Wu, Dongguan (CN); Feng Guo, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 18/655,656

(22) Filed: May 6, 2024

(65) Prior Publication Data

US 2024/0291271 A1     Aug. 29, 2024

Related U.S. Application Data

(63) Continuation of application No. PCT/CN2023/071903, filed on Jan. 12, 2023.

(51) Int. Cl.
H02J 1/10 (2006.01)
H02M 3/158 (2006.01)
(52) U.S. Cl.
CPC .............. H02J 1/106 (2020.01); H02M 3/158 (2013.01)
(58) Field of Classification Search
CPC ............ H02J 1/106; H02J 7/34; H02M 3/158; H02M 1/0045; G06F 1/305

USPC ......... 307/9.1, 64, 65, 77, 66; 320/128, 134, 320/166; 701/22
See application file for complete search history.

(56) References Cited

U.S. PATENT DOCUMENTS

| | | | |
|---|---|---|---|
| 11,095,222 B2* | 8/2021 | Li ...................... | H02M 3/1584 |
| 2005/0088856 A1 | 4/2005 | Yamamoto et al. | |
| 2005/0179324 A1 | 8/2005 | Petricek | |
| 2007/0096703 A1 | 5/2007 | Jain | |
| 2008/0012544 A1 | 1/2008 | Krein et al. | |
| 2008/0054873 A1 | 3/2008 | Inoue | |

(Continued)

FOREIGN PATENT DOCUMENTS

| | | |
|---|---|---|
| CN | 1617432 A | 5/2005 |
| CN | 101136591 A | 3/2008 |
| CN | 104578768 A | 4/2015 |

(Continued)

*Primary Examiner* — Elim Ortiz
(74) *Attorney, Agent, or Firm* — Conley Rose, P.C.

(57) ABSTRACT

A power supply apparatus includes a first power module, a second power module, an energy storage module, and a controller. An output terminal of the first power module is connected in parallel to an output terminal of the second power module, which is then connected to a load, and load dynamic response performance of the second power module is better than load dynamic response performance of the first power module. The energy storage module is connected to the output terminal of the first power module and connected between a midpoint of the load and a reference ground. The energy storage module is configured to store electric energy and supply power to the load. The controller is configured to, in response to the load being in a dynamic change status, control the second power module to supply power to the energy storage module.

20 Claims, 4 Drawing Sheets

(56)　　　　　　　References Cited

U.S. PATENT DOCUMENTS

| | | |
|---|---|---|
| 2016/0036330 A1 | 2/2016 | Sturcken et al. |
| 2019/0089252 A1 | 3/2019 | Li et al. |

FOREIGN PATENT DOCUMENTS

| | | | |
|---|---|---|---|
| CN | 109586572 | A | 4/2019 |
| CN | 110112905 | A | 8/2019 |
| CN | 114301263 | A | 4/2022 |
| EP | 4106170 | A1 | 12/2022 |
| WO | 2016019788 | A1 | 2/2016 |

* cited by examiner

POWER SUPPLY APPARATUS AND POWER SYSTEM

CROSS-REFERENCE TO RELATED APPLICATIONS

This application is a continuation of International Patent Application No. PCT/CN2023/071903, filed on Jan. 12, 2023, which is hereby incorporated by reference in its entirety.

TECHNICAL FIELD

This application relates to the field of circuit technologies, and in particular, to a power supply apparatus and a power system.

BACKGROUND

With the rapid development of cloud computing, various fields, such as weather forecast, stock market analysis, pharmaceutical research and development, and automatic manufacturing, increasingly depend on support of a super computing capability (hereinafter also referred to as super-computing) of a data center with super computing power. For a computing chip as underlying core hardware of supercomputing, high requirements on computing performance of the computing chip cause power consumption of the computing chip to increase from initial tens of watts to hundreds of watts or even thousands of watts. However, power supply to the computing chip still presents a tendency of a low voltage and a high current.

However, in order to implement low-voltage and high-current power supply, there are still many technical challenges to meet currently. For example, a load dynamic response problem of a power supply caused by a load change rate of up to hundreds of amperes per microsecond (A/μs) or even kilo-A/μs is still a technical problem to be resolved currently.

SUMMARY

In view of this, this application provides a power supply apparatus and a power system, to resolve a load dynamic response problem caused by a sudden change of a load, and also ensure stability and efficiency of power supply.

According to a first aspect, this application provides a power supply apparatus, including a first power module, a second power module, an energy storage module, and a controller; an output terminal of the first power module is connected in parallel to an output terminal of the second power module and then connected to a load, and load dynamic response performance of the second power module is better than load dynamic response performance of the first power module; the energy storage module is connected to the output terminal of the first power module and connected between a midpoint of the load and a reference ground, and the energy storage module is configured to: store electric energy and supply power to the load. The controller is connected to the first power module and the second power module, and the controller may be configured to, in response to that the load is in a dynamic change status, control the second power module to supply power to the energy storage module, to quickly respond to a large dynamic change of the load and meet a changed power supply requirement of the load.

Based on such a design, the power supply apparatus in this application can resolve a load dynamic response problem caused by a sudden change of the load. The load dynamic response performance is good, and power supply is stable, so that normal work of the load is more guaranteed. In addition, in the power supply apparatus in this application, a loop bandwidth does not need to be increased or a complex nonlinear control loop does not need to be added. In this way, a problem that an electric energy loss increases caused by the increase in the control loop bandwidth, and a problem that a complex design of component parameters and high interference easily cause an increase in the electric energy loss due to addition of the control loop can be avoided. Therefore, power supply efficiency of the power supply apparatus in this application can also be ensured.

In a possible design, the controller is further configured to, in response to that the load is in a stable status, control the first power module to supply power to the energy storage module, and control the second power module to stop supplying power to the energy storage module. For example, when the load is in the stable status, the first power module supplies power to the load, so that a power supply requirement of the load can be met.

In a possible design, considering that the load extracts electric energy from the energy storage module, when the load jumps, for example, the power supply requirement of the load suddenly changes, the electric energy extracted by the load from the energy storage module changes. As a result, a voltage of the energy storage module changes correspondingly. In an example, a dynamic change of the voltage of the energy storage module may reflect a dynamic change of the load. In an example, the controller may not only obtain a current change amplitude and/or a voltage change amplitude of the load, and determine a status of the load based on the current change amplitude and/or the voltage change amplitude of the load, but also obtain a voltage change amplitude of the energy storage module, and determine the status of the load based on the voltage change amplitude of the energy storage module. In response to the voltage change amplitude of the load being not less than a first voltage threshold, and/or the current change amplitude of the load being not less than a first current threshold, and/or the voltage change amplitude of the energy storage module being not less than a second voltage threshold, the controller may quickly determine that the load is in the dynamic change status. In response to that the voltage change amplitude of the load being less than the first voltage threshold and the current change amplitude of the load being less than the first current threshold, or the voltage change amplitude of the energy storage module being less than the second voltage threshold, the controller may quickly determine that the load is in the stable status. In this way, the controller may correspondingly control work of the first power module and the second power module based on the status of the load.

In a possible design, the second power module includes a switch unit. In this way, the controller may control, in response to that the load is in the dynamic change status, the switch unit to turn on, so that the second power module can charge the energy storage module by using internal resistance of the switch unit. The controller may further control, in response to that the load is in the stable status, the switch unit to turn off, to stop supplying electric energy. In this case, the first power module supplies power to the energy storage module. Based on such a design, the power supply apparatus can quickly supplement electric energy for the energy storage module through brief work of the second power module, thereby avoiding a case in which a voltage drop occurs in the energy storage module.

In a possible design, the second power module includes a switch unit and a current-limiting unit, and the current-limiting unit is electrically connected to the switch unit. In this way, the controller may control, in response to that the load is in the dynamic change status, the switch unit to turn on, so that the second power module can supply power to the energy storage module by using the current-limiting unit. The controller may further control, in response to that the load is in the stable status, the switch unit to turn off, to stop supplying electric energy. In this case, the first power module supplies power to the energy storage module. Based on such a design, the power supply apparatus can quickly supplement electric energy for the energy storage module through brief work of the second power module, thereby avoiding a case in which a voltage drop occurs in the energy storage module.

In a possible design, the switch unit includes a semiconductor switch and/or a mechanical switch, where the semiconductor switch includes a silicon controlled rectifier, a metal-oxide-semiconductor field-effect transistor (MOSFET), an insulated-gate bipolar transistor (IGBT), and/or a gallium nitride high-electron-mobility transistor; and the mechanical switch includes a relay and/or a contactor. In an example, the switch unit may be flexibly selected based on an actual situation.

In a possible design, the second power module includes a linear power supply or a switching power supply, and both the linear power supply and the switching power supply have excellent load dynamic response performance. In an example, when a large sudden change occurs in the load (for example, the load is in a dynamic change status), the controller may control the linear power supply or the switching power supply to be in a working status, to quickly supply power to the energy storage module, thereby avoiding that normal work of the load is affected due to insufficient power supply to the load.

In a possible design, an input terminal of the first power module and an input terminal of the second power module may be electrically connected to a same power supply. In an example, the input terminal of the first power module and the input terminal of the second power module may alternatively be electrically connected to different power supplies. It can be learned that a connection manner of the input terminal of the first power module and the input terminal of the second power module may be flexibly selected based on an actual situation.

According to a second aspect, this application further provides a power system, including a power supply and the power supply apparatus according to any one of the first aspect or the possible implementations of the first aspect, and the power supply apparatus is configured to be electrically connected to the power supply and the load, to supply power to the load.

In a possible design, the load is a computing chip, the power supply is configured to provide a direct current input voltage, and the power supply apparatus is configured to convert the direct current input voltage into a direct current output voltage, and output the direct current output voltage to the computing chip, where the direct current output voltage is less than the direct current input voltage. In addition, in the power supply apparatus, a current output to the load may be increased through a parallel connection between the first power module and the second power module. Based on such a design, the power supply apparatus can provide a low-voltage and high-current direct current power supply environment for the computing chip, and can quickly respond to a dynamically changed power supply requirement of the computing chip.

In addition, for technical effects brought by any one of the possible implementations in the second aspect, refer to technical effects brought by different implementations in the first aspect. Details are not described herein again.

BRIEF DESCRIPTION OF DRAWINGS

To describe technical solutions in embodiments of this application more clearly, the following briefly describes the accompanying drawings used for describing embodiments.

Figure 1:
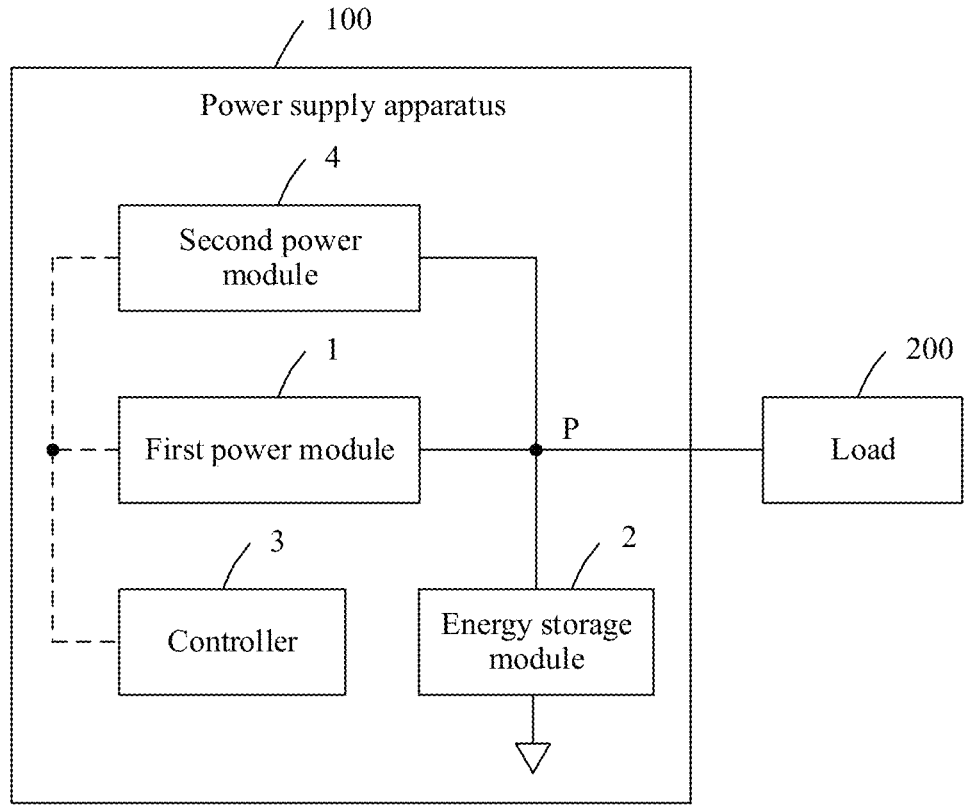
FIG. 1 is a schematic diagram of a power supply apparatus according to an embodiment of this application.

List of reference numerals of main elements

| | |
|---|---|
| Power supply apparatus | 100, 100a, 100b, 100c, 100d, 100e |
| First power module | 1 |
| Direct current converter | 11 |
| Energy storage module | 2 |
| Controller | 3 |
| Second power module | 4, 4a, 4b, 4c, 4d |
| Switch unit | 41 |
| Current-limiting unit | 42 |
| Linear power supply | 43 |
| Switching power supply | 44 |
| Load | 200 |
| Power system | 1000 |
| Power supply | 101 |

In the following specific implementations, this application is further described in detail with reference to the accompanying drawings.

DESCRIPTION OF EMBODIMENTS

The following describes the technical solutions in embodiments of this application with reference to the accompanying drawings in embodiments of this application. It is clear that the described embodiments are some but not all of embodiments of this application.

It may be understood that the connection relationship described in this application is a direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C. It may be further understood that "A is connected to B" described in this application may be that A is directly connected to B, or may be that A is indirectly connected to B by using one or more other electrical components.

In descriptions of this application, unless otherwise specified, "/" means "or". For example, A/B may represent A or B. The term "and/or" in this specification describes only an association relationship between associated objects and indicates that there may be three relationships. For example, A and/or B may represent the following three cases: Only A exists, both A and B exist, and only B exists.

In descriptions of this application, the words such as "first" and "second" are used to distinguish between different objects, and do not limit quantities and execution sequences. In addition, the words such as "first" and "second" do not necessarily limit a definite difference. In addition, terms "include" and "have", and any variant thereof are intended to cover the non-exclusive inclusion.

With the rapid development of cloud computing, various fields, such as weather forecast, stock market analysis, pharmaceutical research and development, and automatic manufacturing, increasingly depend on support of supercomputing capability of a data center with super computing power. For a computing chip as underlying core hardware of supercomputing, high requirements on computing performance of the computing chip cause power consumption of the computing chip to increase from initial tens of watts (W) to hundreds of W or even thousands of W. However, power supply to the computing chip still presents a tendency of a low voltage and a high current.

However, in order to implement the low-voltage and high-current power supply, there are still many technical challenges to meet currently. For example, a load dynamic response problem of a power supply caused by a load change rate of up to hundreds of A/μs or even kilo-A/μs is still a technical problem to be urgently resolved currently.

In an example, embodiments of this application provide a power supply apparatus and a power system, to resolve a load dynamic response problem caused by a sudden change of a load, and also ensure stability and efficiency of power supply, so that stable performance of the load is more effectively guaranteed.

The technical solutions of this application are further described below in detail with reference to the accompanying drawings.

Referring to FIG. 1, a schematic diagram of a power supply apparatus 100 according to an embodiment of this application is shown. The power supply apparatus 100 may be configured to be electrically connected to a load 200, to supply power to the load 200.

It may be understood that a specific type of the load 200 is not limited in this application. For example, in some implementation scenarios, the load 200 may be a computing chip.

It may be understood that the computing chip includes a general-purpose central processing unit (CPU), a graphics processing unit (GPU), a neural processing unit (NPU), an application-specific integrated circuit (ASIC), a field-programmable gate array (FPGA), or another chip having computing power. It may be understood that there may be one or more computing chips, and this does not constitute a limitation on this application.

As shown in FIG. 1, the power supply apparatus 100 includes a first power module 1, an energy storage module 2, and a controller 3.

An output terminal of the first power module 1 is connected to the load 200; and the energy storage module 2 is connected to the output terminal of the first power module 1, and is connected between a midpoint (with reference to a point P in FIG. 1) of the load and a reference ground. The first power module 1 may be configured to supply electric energy to the energy storage module 2. The energy storage module 2 may be configured to store electric energy, and supply the stored electric energy to the load 200, so that the load 200 can be powered on and work. The controller 3 is connected to the first power module 1. The controller 3 may be configured to control a power supply situation of the first power module 1.

It may be understood that a specific circuit structure of the first power module 1 is not limited in this application, provided that the first power module 1 can implement a power supply function.

For example, the first power module 1 may include a plurality of input-parallel output-parallel direct current converters 11. The direct current converter 11 may be any one of circuits/units that can implement a function of converting an input direct current voltage into an output direct current voltage. In addition, an output direct current voltage of the first power module 1 is less than an input direct current voltage, and the first power module 1 can provide a low-voltage and high-current power supply environment.

It may be understood that the direct current converter 11 can obtain electric energy from an external power supply, or the first power module 1 may be provided with an internal power supply to supply power to the direct current converter 11. This is not limited herein.

It may be understood that a circuit structure of the energy storage module 2 is not limited in this application, provided that the energy storage module 2 can implement the foregoing functions.

For example, in some embodiments, the energy storage module 2 may include an energy storage capacitor. The energy storage capacitor includes but is not limited to a solid aluminum capacitor, a tantalum capacitor, and a multi-layer ceramic capacitor (MLCC). The energy storage capacitor can extract electric energy of the first power module 1 for charging, and the charged energy storage capacitor may discharge to the load 200, so that the load 200 is powered on.

It may be understood that the controller 3 may be a general-purpose CPU, a digital signal processor (DSP), a microprocessor, an ASIC, or one or more integrated circuits used to control program execution of the foregoing solutions.

It may be understood that, in a working process of the load 200, a current and/or a voltage of the load 200 may jump due to impact of a temperature, interference, or the like. As a result, a voltage of the energy storage module 2 changes. For example, the current and the voltage of the load 200 suddenly increase, or the current or the voltage of the load 200 suddenly increases, and therefore, more electric energy is extracted from the energy storage module 2 by the load 200. As a result, the voltage of the energy storage module 2 drops, or even deviates from a voltage stabilization precision range.

The first power module 1 has specific load dynamic response performance, and can follow a sudden change of the load 200 to some extent to adjust an output voltage, so that the voltage of the energy storage module 2 remains within a specified voltage stabilization precision range. However, because the sudden change of the load 200 is an instantaneous change, it is difficult to ensure that the first power module 1 can quickly follow the sudden change of the load 200. In addition, when the current and/or the voltage of the load 200 jump/jumps greatly, the first power module 1 may also fail to keep up with the jump of the current and/or the voltage of the load 200. In this case, a voltage drop still occurs in the energy storage module 2, and even the voltage deviates from the specified voltage stabilization precision range. Consequently, normal work of the load 200 is affected.

In an embodiment of this application, the power supply apparatus 100 further includes a second power module 4.

Still referring to FIG. 1, an output terminal of the second power module 4 is connected in parallel to the output terminal of the first power module 1. The output terminal of the second power module 4 is connected to the load 200, and the second power module 4 may also be configured to provide electric energy for the energy storage module 2.

It may be understood that the second power module 4 may be any module that can implement a power supply function.

In some cases, the second power module 4 may obtain electric energy from an external power supply, and then supply the electric energy to the load 200. It may be understood that, when both the first power module 1 and the second power module 4 obtain electric energy from external power supplies, the power supplies that supply the electric energy to the first power module 1 and the second power module 4 may be the same or may be different. This is not limited herein. It may be understood that, when the power supplies that supply the electric energy to the first power module 1 and the second power module 4 are the same, an input terminal of the first power module 1 is connected in parallel to an input terminal of the second power module 4 in this case. In an example, in some other cases, the second power module 4 may alternatively be provided with an internal power supply.

The second power module 4 is connected to the controller 3. The controller 3 may be configured to control a power supply situation of the second power module 4.

It may be understood that, as shown in FIG. 1, the first power module 1 and the second power module 4 are controlled by the same controller 3. In an example, in another implementation, the first power module 1 and the second power module 4 may alternatively be respectively controlled by two controllers 3 that are communicatively connected. This is not limited herein. In addition, the controller 3 may be integrated with the first power module 1 or the second power module 4, or may be independent of the first power module 1 and the second power module 4. This is not limited herein.

In this embodiment of this application, load dynamic response performance of the second power module 4 is better than load dynamic response performance of the first power module 1.

It may be understood that, the load dynamic response performance of the first power module 1/the second power module 4 is used to describe dynamic performance of the first power module 1/the second power module 4 when the load changes. The load dynamic response performance of the first power module 1/the second power module 4 may be reflected in a dynamic restoration time of the voltage and a voltage peak-to-peak ("VPP" which is a difference between a peak value and a valley value of voltage fluctuation, and which may also be referred to as a peak-peak value voltage) in a process in which the first power module 1/the second power module 4 follows the sudden change of the load 200 to adjust a working condition, so that the voltage of the energy storage module 2 is restored to the voltage stabilization precision range from deviation from the voltage stabilization precision range. A shorter dynamic restoration time of the voltage and a smaller VPP indicate or the shorter dynamic restoration time of the voltage or the smaller VPP indicates better load dynamic response performance of the first power module 1/second power module 4.

Therefore, the load dynamic response performance of the second power module 4 is better than the load dynamic response performance of the first power module 1. This may be reflected in that: A voltage dynamic restoration time of the second power module 4 is shorter than a voltage dynamic restoration time of the first power module 1, and a VPP of the second power module 4 is smaller than a VPP of the first power module 1. Therefore, compared with the first power module 1, the second power module 4 has a higher load response speed, and can adapt to a changed load more quickly.

In an embodiment of this application, when the load 200 is in a stable status, the first power module 1 can meet a power supply requirement of the load 200. In an example, the controller 3 may control, in response to that the load 200 is in the stable status, the first power module 1 to supply power to the energy storage module 2. In this case, the controller 3 may control the second power module 4 not to supply power.

When the load 200 is in a dynamic change status, the first power module 1 may fail to keep up with the jump of the current and/or the voltage of the load 200. As a result, a changed power supply requirement of the load 200 cannot be met, and a voltage drop occurs in the energy storage module 2. In an example, the controller 3 may control, in response to that the load 200 is in the dynamic change status, the second power module 4 to quickly supply power to the energy storage module 2, to improve load dynamic response performance, avoid the voltage drop of the energy storage module 2, and ensure normal work of the load 200.

In an example, in the power supply apparatus 100, a branch in which the second power module 4 is located may be equivalent to a high-speed power supply channel.

In this embodiment of this application, the controller 3 may obtain the voltage and the current of the load 200 in real time, to obtain a voltage change amplitude and a current change amplitude of the load 200. Further, the controller 3 may determine, based on the voltage change amplitude and/or the current change amplitude of the load 200, whether the load 200 is in the stable status or in the dynamic change status, so as to correspondingly control power supply to the first power module 1 and power supply to the second power module 4.

The controller 3 may determine, in response to that the voltage change amplitude of the load 200 is not less than a first voltage threshold and/or the current change amplitude of the load 200 is not less than a first current threshold, that the load 200 is in the dynamic change status.

The controller 3 may determine, in response to that the voltage change amplitude of the load 200 is less than the first voltage threshold and the current change amplitude of the load 200 is less than the first current threshold, that the load 200 is in the stable status.

It may be understood that the first voltage threshold and the first current threshold may be correspondingly set based on a parameter specification of the load 200. This is not limited herein. For example, in some cases, the first current threshold may be set to a kilo-A/μs level. Once the current change amplitude of the load 200 reaches the kilo-A/μs level, it indicates that the dynamic change of the load 200 is great, and the load 200 is in the dynamic change status.

It may be understood that the controller 3 may perform, by using a sampling circuit, voltage sampling and current sampling on a branch connected between the load 200 and the energy storage module 2, to obtain the voltage and the current of the load 200.

In this embodiment of this application, because the load 200 extracts electric energy from the energy storage module 2, when the load 200 jumps, for example, the power supply requirement of the load 200 suddenly changes, the electric energy extracted by the load 200 from the energy storage module 2 changes, so that the voltage of the energy storage module 2 changes correspondingly. In an example, the dynamic change of the voltage of the energy storage module 2 may reflect the dynamic change of the load 200.

In an embodiment of this application, the controller 3 may further obtain the voltage change amplitude of the energy storage module 2, and determine the status of the load based on the voltage change amplitude of the energy storage module 2.

The controller may quickly determine, in response to that the voltage change amplitude of the energy storage module 2 is not less than a second voltage threshold, that the load 200 is in the dynamic change status. The controller may quickly determine, in response to that the voltage change amplitude of the energy storage module 2 is less than the second voltage threshold, that the load is in the stable status. It may be understood that the second voltage threshold may be correspondingly set based on parameter specifications of the load 200 and the energy storage module 2. This is not limited herein. The energy storage module 2 and the load 200 may respectively correspond to different voltage thresholds.

In this embodiment of this application, when the load 200 dynamically changes, the controller 3 may correspondingly control a power supply situation of the first power module 1 based on an actual requirement.

For example, when the voltage and the current of the load 200 increase, or the voltage or the current of the load 200 increases, if electric energy output by the second power module 4 can meet an increased power supply requirement of the load 200, the controller 3 may control the first power module 1 not to supply power. In an example, when the voltage and the current of the load 200 increase, or the voltage or the current of the load 200 increases, the controller 3 may alternatively control both the first power module 1 and the second power module 4 to supply power. Because both the first power module 1 and the second power module 4 can output electric energy in this case, the power supply apparatus 100 can more quickly meet the increased power supply requirement of the load 200.

In this embodiment of this application, because the second power module 4 can implement fast power supply, the second power module 4 can enable the voltage of the energy storage module 2 to recover, so that the voltage of the energy storage module 2 is stable within a specified voltage stabilization precision range. In other words, the voltage change amplitude of the energy storage module 2 is less than the second voltage threshold. In an example, in this case, the load 200 has been restored to the stable status. In an example, in response to that the load is in the stable status, the controller 3 may control the second power module 4 to stop supplying power to the energy storage module 2, and control the first power module 1 to continue supplying power to the energy storage module 2.

In this embodiment of this application, considering that the voltage of the energy storage module 2 may recover after the second power module 4 supplies power for specific duration, so that the voltage change amplitude is less than the second voltage threshold, the controller 3 may not only determine the voltage change amplitude of the energy storage module 2 by detecting the voltage of the energy storage module 2 in real time, but also time a power supply time of the second power module 4. After the power supply time of the second power module 4 reaches specified duration, the controller 3 may determine that the voltage change amplitude of the energy storage module 2 is less than the second voltage threshold. In other words, the load 200 is restored to the stable status.

It may be understood that the specified duration may be correspondingly set based on the parameter specification of the second power module 4, internal resistance of the branch in which the second power module 4 is located, and the like. This is not limited herein. After the second power module 4 supplies power for the specified duration, the voltage of the energy storage module 2 recovers, and stabilizes within the specified voltage stabilization precision range.

It may be understood that the voltage stabilization precision range may be correspondingly set based on a specification of the load 200. This is not limited herein.

In an example, the power supply apparatus 100 in this application controls, in response to that the load 200 is in the dynamic change status, the second power module 4 to quickly supplement electric energy, so that the load 200 is restored to the stable status. It can be learned that the power supply apparatus 100 in this application can quickly respond to the dynamic change of the load 200 by using the second power module 4, to meet a suddenly changed power supply requirement of the load 200, and resolve a load dynamic response problem caused by a sudden change of the load.

In an example, the load dynamic response performance of the power supply apparatus 100 in this application can be effectively improved. In another example, the power supply apparatus 100 in this application can prevent the voltage of the energy storage module 2 from deviating from the specified voltage stabilization precision range, so as to ensure stable power supply of the power supply apparatus 100. Therefore, normal work of the load 200 can be more guaranteed.

In addition, the power supply apparatus 100 in this application only needs to control power supply situations of the first power module 1 and the second power module 4. In other words, the load dynamic response problem can be resolved. In an example, in the power supply apparatus 100 in this application, a loop bandwidth does not need to be increased or a complex nonlinear control loop does not need to be added. In this way, a problem that an electric energy loss increases caused by the increase in the control loop bandwidth, and a problem that a complex design of component parameters and high interference easily cause an increase in the electric energy loss due to addition of the control loop can be avoided. Therefore, power supply efficiency of the power supply apparatus 100 in this application can also be ensured.

The following describes a power supply apparatus 100 in an embodiment of this application by using Embodiment 1 to Embodiment 4.

For ease of description, an example in which the first power module 1 includes the plurality of input-parallel output-parallel direct current converters 11, the energy storage module 2 is an energy storage capacitor C, and the load 200 is the computing chip is used for description.

Embodiment 1

Figure 2A:
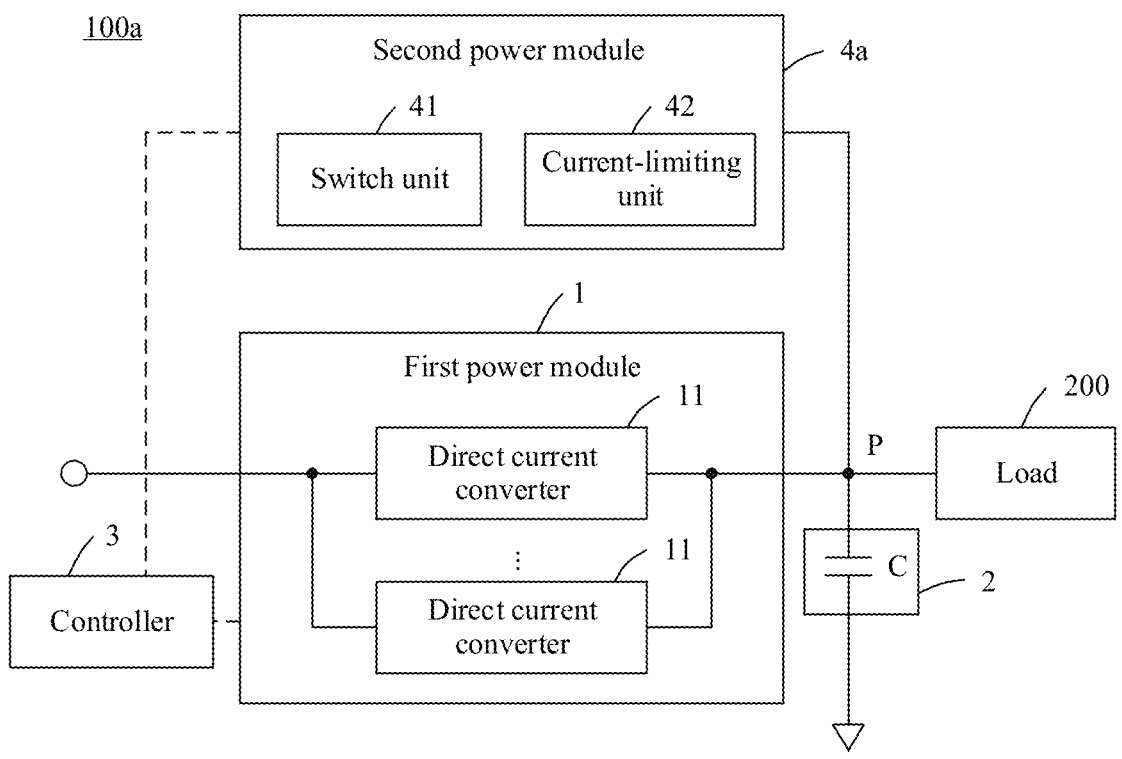
FIG. 2A is a schematic diagram of a structure of one implementation of the power supply apparatus shown in FIG. 1.

Referring to FIG. 2A, a schematic diagram of a structure of a power supply apparatus 100*a* according to Embodiment 1 of this application is shown.

As shown in FIG. 2A, the power supply apparatus 100*a* includes a first power module 1, an energy storage module 2, a controller 3, and a second power module 4*a*.

An input terminal of the first power module 1 is connected in parallel to an input terminal of the second power module 4*a*, to obtain electric energy from a same external power supply. An output terminal of the first power module 1 and an output terminal of the second power module 4*a* are connected in parallel, and both are electrically connected to the load 200, that is, the computing chip. The energy storage module 2 is electrically connected between the load 200 and the output terminals of the first power module 1 and the second power module 4*a*.

In Embodiment 1, the second power module 4*a* includes a switch unit 41 and a current-limiting unit 42. The switch unit 41 includes at least one switch device that can implement switching between a turn-on state and a turn-off state. The current-limiting unit 42 includes at least one current-limiting resistor.

It may be understood that the switch device may be a semiconductor switch and/or a mechanical switch. This is not limited herein. The semiconductor switch includes but is not limited to a silicon controlled rectifier (SCR), a metal-oxide-semiconductor field-effect transistor (MOSFET), an insulated gate bipolar transistor (IGBT), and/or a gallium nitride (GaN) high electron mobility transistor (GaN HEMT). The mechanical switch includes but is not limited to a relay and/or a contactor. A state (for example, a turn-off state or a turn-on state) of the switch device may be controlled by the controller 3.

The switch unit 41 is electrically connected to the current-limiting unit 42. It may be understood that the switch device in the switch unit 41 may be connected in series, in parallel, or in series-parallel to the current-limiting resistor in the current-limiting unit 42. This is not limited herein. The current-limiting unit 42 may limit a current of a branch in which the switch unit 41 is located.

Based on such a design, when the computing chip is in a stable status, in other words, when a voltage change amplitude of the energy storage module 2 is less than a second voltage threshold, the controller 3 may control, in response to that the computing chip is in the stable status, the first power module 1 to output electric energy to the energy storage module 2. The controller 3 may control the switch unit 41 in the second power module 4*a* to be in the turn-off state, so that a branch in which the second power module 4*a* is located is disconnected. In this way, the second power module 4*a* does not output electric energy to the energy storage module 2.

When the computing chip is in a dynamic change status, in other words, when the voltage change amplitude of the energy storage module 2 is greater than or equal to the second voltage threshold, the controller 3 may control, in response to that the computing chip is in the dynamic change status, the switch unit 41 in the second power module 4*a* to switch to the turn-on state, so that the branch in which the second power module 4*a* is located is connected. In this way, the second power module 4*a* starts to output electric energy to the energy storage module 2. The first power module 1 may keep supplying power to the energy storage module 2, or may stop supplying power to the energy storage module 2.

It may be understood that, because the switch unit 41 may directly transmit electric energy without a voltage conversion process, the switch unit 41 may inject the electric energy into the energy storage module 2 by using the current-limiting unit 42, to quickly supply power to the energy storage module 2. In an example, a power supply speed of the second power module 4*a* may be higher than a power supply speed of the first power module 1. In this way, the second power module 4*a* can supply power to the energy storage module 2 more quickly, so as to quickly respond to the dynamic change of the load 200. Therefore, a load dynamic response characteristic of the second power module 4*a* is better.

In an example, when electric energy extracted by the load 200 from the energy storage module 2 suddenly increases, because the energy storage module 2 can obtain high-speed power supply of the second power module 4*a*, electric energy of the energy storage module 2 is sufficient to be supplied to the computing chip. In addition, the voltage change amplitude of the energy storage module 2 may be quickly restored to be less than the second voltage threshold. That is, no obvious voltage drop occurs in the energy storage module 2. After the voltage change amplitude of the energy storage module 2 is restored to be less than the second voltage threshold, under control of the controller 3, the switch unit 41 switches back to the turn-off state, and the first power module 1 continues outputting electric energy, to maintain electric energy supply to the load 200.

In an example, even if a current and a voltage of the load 200 of the computing chip jump greatly, or the current or the voltage of the load 200 of the computing chip jumps greatly, the power supply apparatus 100*a* can still quickly adapt to the changed current and/or voltage of the load 200. It can be learned that, the load dynamic response characteristic of the power supply apparatus 100*a* in Embodiment 1 is effectively improved, and voltage fluctuation of the energy storage module 2 is effectively suppressed. In this way, it can be ensured that power supply to the computing chip is stable, so that the computing chip can keep working normally.

For example, in a possible scenario, the energy storage capacitor C of the energy storage module 2 is 10000 microfarads (μF). The computing chip requires load dynamic response performance of the power supply apparatus 100*a* to meet: VPP fluctuation is less than 5 percent (%), for example, the second voltage threshold is 50 millivolts (mV).

A power supply process of the power supply apparatus 100*a* may include, for example, the following time periods t1 to t4:

In the time period t1, the computing chip is in the stable status. In an example, under control of the controller 3, the first power module 1 transmits electric energy to the energy storage capacitor C, so that the computing chip can obtain electric energy from the energy storage capacitor C. The switch unit 41 is in the turn-off state, so that the second power module 4 does not supply power. In this case, a voltage of the energy storage capacitor C remains at approximately Vo, and a fluctuation amplitude is less than 50 mV.

In the time period t2 (t2=1 microsecond (μs)) after t1, power supply situations of the first power module 1 and the second power module 4*a* are the same as power supply situations in t1. However, a current of the computing chip changes suddenly from 0 to 1000 amperes (A) (for example, a current change rate of the computing chip is 1000 A/μs).

In the time period t3 (t3=1 μs) after t2, the power supply situations of the first power module 1 and the second power module 4*a* are the same as the power supply situations in t2, but the current of the computing chip remains at 1000 A.

Therefore, it may be understood that, after the time periods t2 and t3, a quantity of electric charges, in coulombs (C), extracted by the computing chip from the energy storage capacitor C is Q=IT=500 A×1 μs+1000 A×1 μs=1500 u C, wherein I is the current and T is the time period.

In the formula, 500 A×1 μs is a quantity of electric charges extracted by the computing chip in the time period t2, where 500 A is a current of the computing chip in the time period t2, and the current is an average current, that is, 500 A=1000 A/2. 1000 A×1 μs is a quantity of electric charges extracted by the computing chip in the time period t3.

Therefore, after the time periods t2 and t3, the VPP of the energy storage capacitor C is: ΔU=Q/C=1500 u C/10000 μF=0.15 V. It can be learned that 0.15 V is greater than 50 mV. U is a VPP, Q is an electric charge, and C is a capacitance of the capacitor.

In an example, the VPP of the energy storage capacitor C exceeds the second voltage threshold. Therefore, the controller 3 may determine that the computing chip has switched from the stable status to the dynamic change status after the time periods t2 and t3. In this case, the first power module 1 has failed to quickly follow a sudden change of the current of the computing chip. If the first power module 1 continues supplying power, an obvious voltage drop occurs in the energy storage capacitor C, and power supply to the computing chip is insufficient.

Based on this, to meet a power supply requirement of the computing chip after the sudden change, and avoid the obvious voltage drop in the energy storage capacitor C, in the time period t4 after t3, under control of the controller 3, the switch unit 41 is switched to the turn-on state, so that electric energy can be directly injected into the energy storage capacitor C. In this way, the voltage of the energy storage module 2 can quickly recover, and the computing chip can obtain sufficient electric energy. It can be learned that the second power module 4a can quickly respond to the sudden change of the current of the computing chip, so that the load dynamic response performance of the power supply apparatus 100a is improved.

In the time period t4, the controller 3 may control the first power module 1 to continue working, or may control the first power module 1 to stop working.

When the voltage of the energy storage module 2 recovers to approximately Vo, and the fluctuation amplitude is less than 50 mV, the controller 3 controls the switch unit 41 to be turned on again, and controls the first power module 1 to continue supplying power to the computing chip. In an example, the power supply apparatus 100a is restored to the power supply situation in the time period t1.

Embodiment 2

Figure 2B:
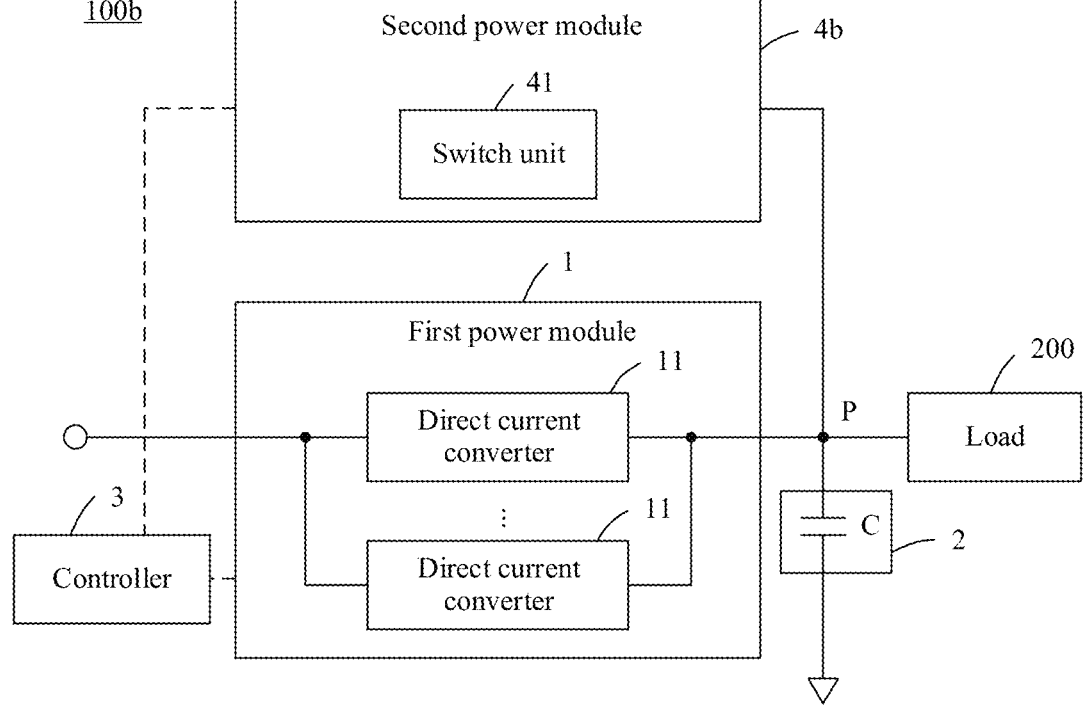
FIG. 2B is a schematic diagram of a structure of another implementation of the power supply apparatus shown in FIG. 1.

Referring to FIG. 2B, a schematic diagram of a power supply apparatus 100b according to Embodiment 2 of this application is shown.

As shown in FIG. 2B, a difference between the power supply apparatus 100b in Embodiment 2 and the power supply apparatus 100a in Embodiment 1 lies in a second power module 4b.

In Embodiment 2, the second power module 4b includes the switch unit 41, but does not include the current-limiting unit 42.

Based on such a design, when the controller 3 controls the switch unit 41 to be in the turn-on state, the switch unit 41 may inject electric energy into the energy storage module 2 by using an internal resistance (for example, using a copper sheet and/or a conducting wire of the branch in which the switch unit 41 is located), to supply power to the energy storage module 2 at a high speed. The internal resistance may be used to limit the current.

It may be understood that, for a detailed working process of the power supply apparatus 100b, reference may be made to the description in Embodiment 1, and details are not described herein again.

Embodiment 3

Figure 2C:
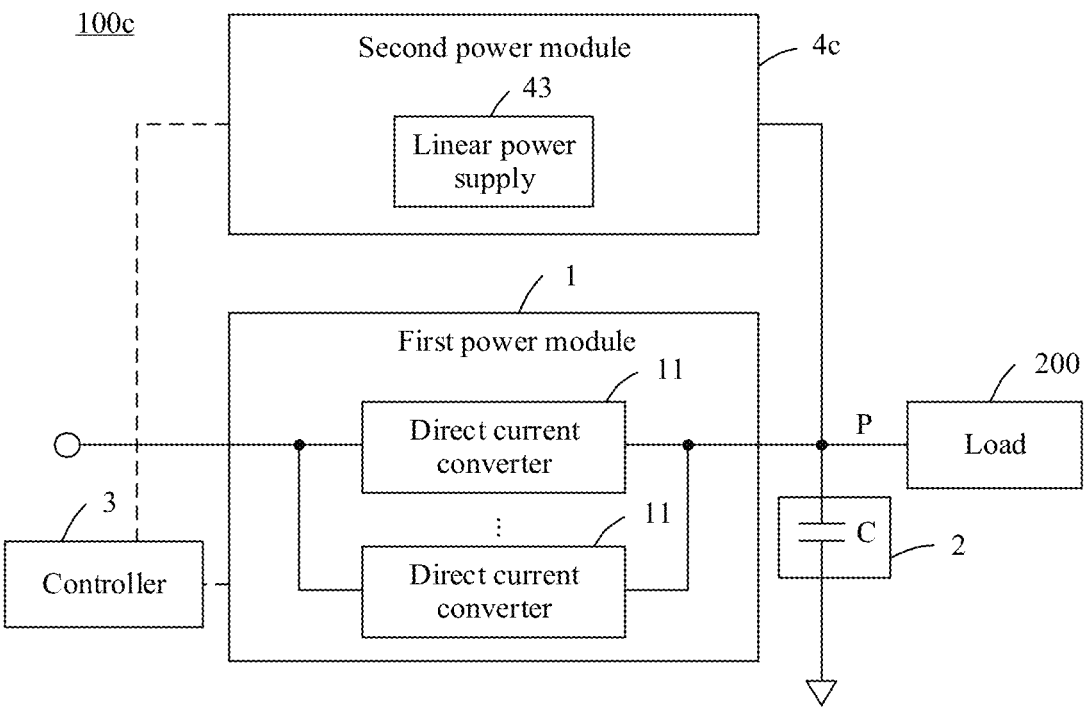
FIG. 2C is a schematic diagram of a structure of another implementation of the power supply apparatus shown in FIG. 1.

Referring to FIG. 2C, a schematic diagram of a power supply apparatus 100c according to Embodiment 3 of this application is shown.

As shown in FIG. 2C, a difference between the power supply apparatus 100c in Embodiment 3 and the power supply apparatus 100a in Embodiment 1 lies in a second power module 4c.

In Embodiment 3, the second power module 4c includes a linear power supply 43. The linear power supply 43 may be configured to: compare an output voltage with a reference voltage, and automatically adjust an output voltage based on a comparison result. Therefore, the linear power supply 43 has ultra-high-speed load dynamic response performance.

Therefore, when the computing chip is in the stable status (for example, when the voltage change amplitude of the energy storage module 2 is less than the second voltage threshold), the controller 3 may control, in response to that the computing chip is in the stable status, the first power module 1 to be in a working status, to output electric energy to the energy storage module 2. In this case, the controller 3 may control the linear power supply 43 in the second power module 4c to be in a state of stopping work, and not to output electric energy to the energy storage module 2.

When the computing chip is in the dynamic change status (for example, the voltage change amplitude of the energy storage module 2 is greater than or equal to the second voltage threshold), because load dynamic response performance of the linear power supply 43 is better than load dynamic response performance of the direct current converter 11 of the first power module 1, the controller 3 may control, in response to that the computing chip is in the dynamic change status, the linear power supply 43 to start to work, to output electric energy to the energy storage module 2. In this case, the controller 3 may control the first power module 1 to continue supplying power, or may control the first power module 1 to stop supplying power.

In this way, the linear power supply 43 may quickly adjust an output voltage based on the voltage of the energy storage module 2, so that the voltage change amplitude of the energy storage module 2 can be quickly restored to be less than the corresponding second voltage threshold. In an example, regardless of whether the dynamic change of the load 200 is large or small, the power supply apparatus 100c in Embodiment 3 can quickly respond to the dynamic change of the load 200, load dynamic response performance is significantly improved, and voltage fluctuation of the energy storage module 2 can be effectively alleviated.

Embodiment 4

Figure 2D:
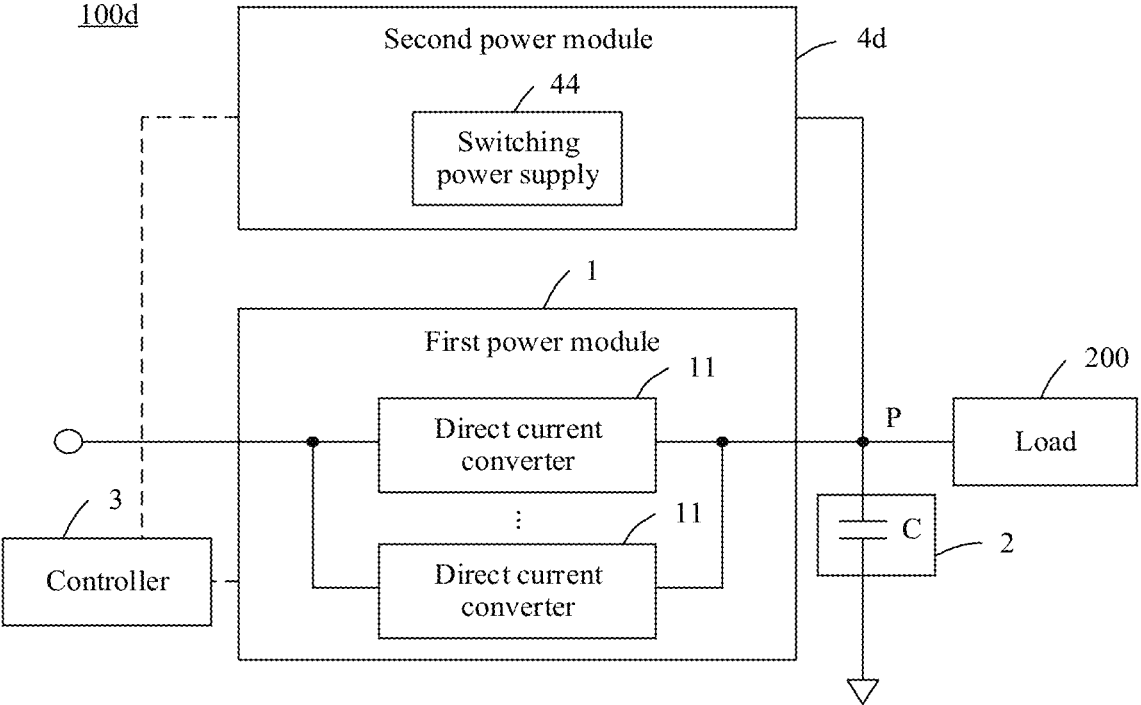
FIG. 2D is a schematic diagram of a structure of another implementation of the power supply apparatus shown in FIG. 1.

Referring to FIG. 2D, a schematic diagram of a power supply apparatus 100d according to Embodiment 4 of this application is shown.

As shown in FIG. 2D, a difference between the power supply apparatus 100d in Embodiment 4 and the power supply apparatus 100a in Embodiment 1 lies in a second power module 4d.

In Embodiment 4, the second power module 4*d* includes a switching power supply 44. The switching power supply 44 may be configured to implement voltage conversion through status switching of a power switching tube.

In Embodiment 4, the switching power supply 44 in the second power module 4*d* is a direct current switching power supply 44 that may be configured to output a direct current.

In Embodiment 4, load dynamic response performance of the switching power supply 44 is better than load dynamic response performance of the direct current converter 11 in the first power module 1. A bandwidth of the switching power supply 44 is greater than a bandwidth of the direct current converter 11 in the first power module 1, and a switching frequency of a power switch device in the switching power supply 44 is higher than a switching frequency of a power switch device in the direct current converter 11. Therefore, a dynamic response speed of the switching power supply 44 may be higher than a dynamic response speed of the direct current converter 11.

Therefore, when the computing chip is in the stable status (for example, the voltage change amplitude of the energy storage module 2 is less than the second voltage threshold), the controller 3 may control, in response to that the computing chip is in the stable status, the first power module 1 to supply power to the energy storage module 2. In this case, the controller 3 may control the switching power supply 44 in the second power module 4*d* to stop working.

When the computing chip is in the dynamic change status (for example, the voltage change amplitude of the energy storage module 2 is greater than or equal to the second voltage threshold), the controller 3 may control, in response to that the computing chip is in the dynamic change status, the switching power supply 44 to start to work, to quickly supply power to the energy storage module 2. In this case, the controller 3 may control the first power module 1 to continue supplying power to the energy storage module 2, or may stop supplying power.

In this way, regardless of whether the dynamic change of the load 200 is large or small, the voltage change amplitude of the energy storage module 2 can be quickly restored to be less than the second voltage threshold. In an example, for the power supply apparatus 100*d* in Embodiment 4, good load dynamic response performance is implemented, and voltage fluctuation of the energy storage module 2 can be suppressed, so as to avoid affecting normal work of the computing chip.

Figure 3:
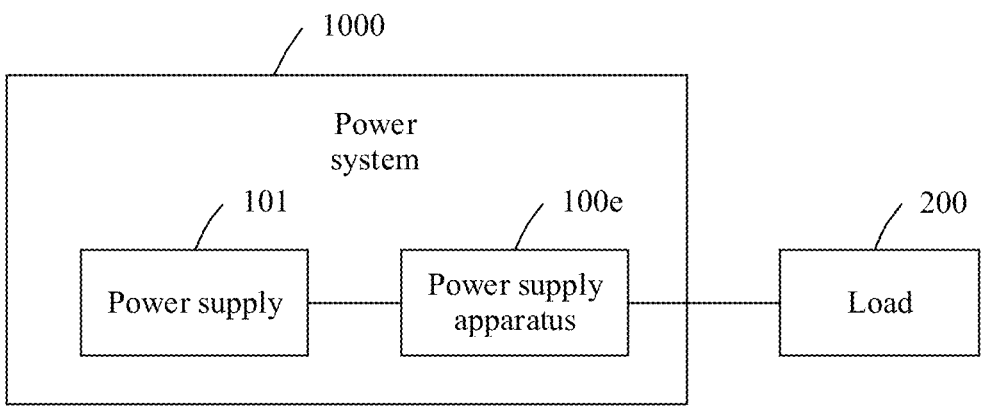
FIG. 3 is a schematic diagram of a power system according to an embodiment of this application.

Referring to FIG. 3, a schematic diagram of a power system 1000 according to an embodiment of this application is shown.

As shown in FIG. 3, the power system 1000 includes a power supply 101 and a power supply apparatus 100*e*. The power supply 101 is electrically connected to the power supply apparatus 100*e*, so that the power supply apparatus 100*e* can obtain electric energy from the power supply 101. The power supply apparatus 100*e* may be configured to be electrically connected to the load 200, so as to provide electric energy for the load 200.

It may be understood that the power supply 101 is not limited in this application, provided that the power supply 101 can supply power to the power supply apparatus 100*e*. For example, the power supply 101 may be a battery, or may be a rectifier that may be configured to convert an alternating current into a direct current.

It may be understood that the power supply apparatus 100*e* may be any one of the power supply apparatuses 100, 100*a*, 100*b*, 100*c*, and 100*d* in FIG. 1 to FIG. 2D. For specific description, reference may be made to the foregoing content in the embodiments, and details are not described herein again.

It may be understood that a specific type of the load 200 is not limited in this application. For example, in some application scenarios, the load 200 may be the computing chip.

In this application scenario, to ensure power supply efficiency and accuracy, the power supply apparatus 100*e* may be disposed close to the computing chip. In an example, the power supply apparatus 100*e* is used as a point of load (POL) power supply. The power supply apparatus 100*e* may obtain a direct current from the power supply 101, and then convert the obtained direct current into a low-voltage and high-current direct current required by the computing chip.

In addition, because the power supply apparatus 100*e* has good load dynamic response performance, even if a voltage jump and a current jump occur or the voltage jump or the current jump occurs in the direct current required by the computing chip, the power supply apparatus 100*e* can quickly respond to a changed power supply requirement of the computing chip, so that normal work of the computing chip is not affected.

All functional units in embodiments of this application may be integrated into one processing unit, each unit may be separately used as one unit, or two or more units may be integrated into one unit. The integrated units may be implemented in a form of hardware, or may be implemented in a form of a hardware plus software functional unit.

If the integrated unit in this application is implemented in a form of a software functional module and sold or used as an independent product, the integrated unit may also be stored in a computer-readable storage medium. Based on such an understanding, the technical solutions of embodiments of this application may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes various media that can store program code, such as a portable storage device, a read-only memory (ROM), a random-access memory (RAM), a magnetic disk, and a compact disc.

The foregoing descriptions are example implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A power supply apparatus, comprising:
   a first power system comprising a first power system output terminal configured to connect to a load, wherein the first power system has a first dynamic response performance;
   a second power system comprising a second power system output terminal connected in parallel to the first power system output terminal, wherein the second power system has a second dynamic response performance that is better than the first dynamic response performance, and wherein the first dynamic response and the second dynamic response indicate a dynamic restoration time of a voltage to a voltage stabilization precision range when the load is in a dynamic change status;

an energy storage system connected to:

the first power system output terminal;

the second power system output terminal; and a point between the load and the first power system output terminal, and a reference ground, wherein the energy storage system is configured to:

store electric energy; and supply power to the load; and a controller configured to;

control first power system to supply a first power to the energy storage system when the load is in the dynamic change status; and control the second power system to supplement the first power by supplying a second power to the energy storage system when the load is in the dynamic change status.

2. The power supply apparatus of claim 1, wherein the controller is further configured to control the first power system to supply the first power to the energy storage system and control the second power system to stop supplying the second power to the energy storage system in response to the load being in a stable status.

3. The power supply apparatus of claim 1, wherein the dynamic change status of the load is when a first voltage change amplitude of the load is not less than a first voltage threshold or a current change amplitude of the load is not less than a first current threshold.

4. The power supply apparatus of claim 2, wherein the stable status of the load is when a first voltage change amplitude of the load is less than a first voltage threshold and a current change amplitude of the load is less than a first current threshold.

5. The power supply apparatus of claim 2, wherein the second power system comprises a switch system, wherein the controller is further configured to:

control the switch system to turn on in response to the load being in the dynamic change status; and control the switch system to turn off in response to the load being in the stable status, and wherein the second power system is configured to charge the energy storage system using an internal resistance of the switch system in response to the switch system being turned on.

6. The power supply apparatus of claim 2, wherein the second power system comprises a switch system and a current-limiting system, wherein the current-limiting system is electrically connected to the switch system, and wherein the controller is further configured to:

control the switch system to turn on in response to the load being in the dynamic change status; and control the switch system to turn off in response to the load being in the stable status, wherein the second power system is configured to charge the energy storage system using the current-limiting system in response to the switch system being turned on.

7. The power supply apparatus of claim 5, wherein the switch system comprises a semiconductor switch or a mechanical switch, wherein the semiconductor switch comprises a silicon controlled rectifier, a metal-oxide-semiconductor field-effect transistor (MOSFET), an insulated-gate bipolar transistor (IGBT), or a gallium nitride high-electron-mobility transistor (GaN HEMT), and wherein the mechanical switch comprises a relay or a contactor.

8. The power supply apparatus of claim 1, wherein the second power system comprises a linear power supply or a switching power supply.

9. The power supply apparatus of claim 1, wherein the first power system comprises a first power system input terminal, wherein the second power system comprises a second power system input terminal, and wherein the first power system input terminal and the second power system are configured to be electrically connected to a same power supply or to different power supplies.

10. A power system, comprising:

a power supply; and a power supply apparatus electrically connected to the power supply and configured to electrically connect to a load for supplying power to the load, wherein the power supply apparatus comprises:

a first power system comprising a first power system output terminal configured to connect to the load, wherein the first power system has a first dynamic response performance;

a second power system comprising a second power system output terminal connected in parallel to the first power system output terminal, wherein the second power system has a second dynamic response performance that is better than the first dynamic response performance, and wherein the first dynamic response and the second dynamic response indicate a dynamic restoration time of a voltage to a voltage stabilization precision range when the load is in a dynamic change status;

an energy storage system connected to:

the first power system output terminal;

the second power system output terminal; and a point between the load and the first power system output terminal, and a reference ground, wherein the energy storage system is configured to:

store electric energy; and supply power to the load; and a controller configured to:

control the first power system to supply a first power to the energy storage system when the load is in the dynamic change status; and control the second power system to supplement the first power by supplying a second power to the energy storage system when the load is in the dynamic change status.

11. The power system of claim 10, wherein the load is a computing chip, wherein the power supply is configured to provide a direct current input voltage, and wherein the power supply apparatus is further configured to:

convert the direct current input voltage into a direct current output voltage that is less than the direct current input voltage; and output the direct current output voltage to the computing chip.

12. The power system of claim 10, wherein the controller is further configured to control the first power system to supply the first power to the energy storage system and control the second power system to stop supplying the second power to the energy storage system in response to the load being in a stable status.

13. The power system of claim 10, wherein the dynamic change status of the load is when a second voltage change amplitude of the energy storage system is not less than a second voltage threshold.

14. The power system of claim 12, wherein the stable status of the load is when a second voltage change amplitude of the energy storage system is less than a second voltage threshold.

15. The power system of claim 12, wherein the second power system comprises a switch system, wherein the controller is further configured to:

control the switch system to turn on in response to the load being in the dynamic change status; and control the switch system to turn off in response to the load being in the stable status, and wherein the second power system is configured to charge the energy storage system using an internal resistance of the switch system in response to the switch system being turned on.

16. The power system of claim 12, wherein the second power system comprises a switch system and a current-limiting system, wherein the current-limiting system is electrically connected to the switch system, and wherein the controller is configured to:

control the switch system to turn on in response to the load being in the dynamic change status; and control the switch system to turn off in response to the load being in the stable status, and wherein the second power system is configured to charge the energy storage system using the current-limiting system when the switch system is turned on.

17. The power system of claim 16, wherein the switch system comprises a semiconductor switch or a mechanical switch, wherein the semiconductor switch comprises a silicon controlled rectifier, a metal-oxide-semiconductor field-effect transistor (MOSFET), an insulated gate bipolar transistor (IGBT), or a gallium nitride high electron mobility transistor (GaN HEMT), and wherein the mechanical switch comprises a relay or a contactor.

18. The power system of claim 10, wherein the second power system comprises a linear power supply.

19. The power system of claim 10, wherein the second power system comprises a switching power supply.

20. The power system of claim 10, wherein the first power system comprises a first power system input terminal, wherein the second power system comprises a second power system input terminal, and wherein the first power system input terminal and the second power system are configured to be electrically connected to a same power supply or to different power supplies.

* * * * *